United States Patent
Hallberg

(10) Patent No.: US 10,843,116 B2
(45) Date of Patent: Nov. 24, 2020

(54) METHOD AND DEVICE FOR REDUCING A FLOW OF SOIL AIR TO INDOOR AIR IN A BUILDING

(71) Applicant: Per Hallberg, Norrtälje (SE)

(72) Inventor: Per Hallberg, Norrtälje (SE)

(*) Notice: Subject to any disclaimer, the term of this patent is extended or adjusted under 35 U.S.C. 154(b) by 382 days.

(21) Appl. No.: 15/740,853

(22) PCT Filed: Jul. 1, 2016

(86) PCT No.: PCT/SE2016/050676
§ 371 (c)(1),
(2) Date: Dec. 29, 2017

(87) PCT Pub. No.: WO2017/007407
PCT Pub. Date: Jan. 12, 2017

(65) Prior Publication Data
US 2018/0339259 A1    Nov. 29, 2018

(30) Foreign Application Priority Data
Jul. 3, 2015 (SE) ..................... 1550959

(51) Int. Cl.
*B01D 53/22* (2006.01)
*B01D 53/02* (2006.01)
(Continued)

(52) U.S. Cl.
CPC ............. *B01D 53/02* (2013.01); *E02D 31/00* (2013.01); *F24F 11/0001* (2013.01);
(Continued)

(58) Field of Classification Search
CPC .. F24F 11/0001; F24F 2007/001; F24F 11/30; F24F 2003/1696; E02D 31/00; E04F 13/007; G21F 1/00
See application file for complete search history.

(56) References Cited

U.S. PATENT DOCUMENTS 1,507,420 A * 9/1924 Parmley ................ F16L 51/005
285/230
1,841,865 A * 1/1932 Whiting ................... E04B 2/842
52/97
(Continued)

FOREIGN PATENT DOCUMENTS

DE   4205408 A1   8/1993
DE   4226722 A1   2/1994
(Continued)

OTHER PUBLICATIONS

Horn, Machine Translation of DE4205408, 14 pages (Year: 1992).*
(Continued)

*Primary Examiner* — Anthony R Shumate
(74) *Attorney, Agent, or Firm* — Dilworth & Barrese, LLP

(57) ABSTRACT

The present invention relates to a method for reducing a flow of soil air to the indoor air in a building (1), wherein the building comprises at least one wall (2), which wall comprises a permeable channel (23) connected with soil air, wherein the method comprises achieving a flow stop (24) for the soil air in the permeable channel (23). The invention also pertains to a device to reduce the flow of soil air to indoor air in a building (1).

9 Claims, 3 Drawing Sheets

(51) Int. Cl.
*G21F 1/00* (2006.01)
*E02D 31/00* (2006.01)
*F24F 11/00* (2018.01)
*F24F 11/30* (2018.01)
*E04F 13/00* (2006.01)
*F24F 3/16* (2006.01)
*F24F 7/00* (2006.01)

(52) U.S. Cl.
CPC ............... *F24F 11/30* (2018.01); *G21F 1/00* (2013.01); *E04F 13/007* (2013.01); *F24F 2003/1696* (2013.01); *F24F 2007/001* (2013.01)

(56) References Cited

U.S. PATENT DOCUMENTS

| | | | | | |
|---|---|---|---|---|---|
| 1,942,125 | A | * | 1/1934 | Ross | E06B 3/44 |
| | | | | | 52/204.591 |
| 1,980,660 | A | * | 11/1934 | Bonn | E04B 2/703 |
| | | | | | 52/92.2 |
| 2,140,691 | A | * | 12/1938 | Crump | E04D 1/265 |
| | | | | | 52/96 |
| 2,171,813 | A | * | 9/1939 | Stockstrom | F16N 31/006 |
| | | | | | 229/800 |
| 2,185,532 | A | * | 1/1940 | Waterman | E04H 5/08 |
| | | | | | 52/93.1 |
| 2,194,109 | A | * | 3/1940 | Bader | B60J 10/70 |
| | | | | | 49/441 |
| 2,209,384 | A | * | 7/1940 | Brown | E06B 7/084 |
| | | | | | 49/82.1 |
| 2,319,723 | A | * | 5/1943 | Crowe | B60R 13/07 |
| | | | | | 296/135 |
| 2,359,304 | A | * | 10/1944 | Davison | E04B 1/20 |
| | | | | | 52/262 |
| 4,129,967 | A | * | 12/1978 | Barlow | E01D 19/06 |
| | | | | | 404/69 |
| 4,307,554 | A | * | 12/1981 | Morrison | E04G 11/04 |
| | | | | | 52/745.07 |
| 4,907,386 | A | | 3/1990 | Ekroth | |
| 5,107,642 | A | | 4/1992 | Mogstad | |
| 6,543,189 | B1 | | 4/2003 | Wood, Jr. et al. | |
| 8,806,824 | B2 | | 8/2014 | Schwan | |
| 2007/0157533 | A1 | | 7/2007 | Janesky et al. | |

FOREIGN PATENT DOCUMENTS

| | | |
|---|---|---|
| DE | 4311810 A1 | 10/1994 |
| DE | 4446891 A1 | 7/1995 |
| EP | 0528502 A1 | 2/1993 |
| EP | 0583858 A1 | 2/1994 |
| EP | 2177669 A2 | 4/2010 |
| FR | 2883960 A1 | 10/2006 |
| GB | 2236127 A | 3/1991 |
| GB | 2478342 A | 9/2011 |
| KR | 20120040927 A | 4/2012 |
| WO | 2009044047 A2 | 4/2009 |

OTHER PUBLICATIONS

Horn, Machine Translation of DE4446691, 16 pages. (Year: 1994).*
Leung, et al., "Radon Mitigation by Depressurization of Concrete Walls and Slabs," Health Physics 77: 420-426 (Oct. 1999).
Sanjuan et al, "Energy performance of an open-joint-ventilated façade compared with a conventional sealed cavity façade," Solar Energy 85: 1851-1863 (2011).
Zhang et al, "The application of air layers in building envelopes: A review," Applied Energy 165: 707-734 (2016).
Abu-Jarad, "Some factors affecting the concentration of radon and its daughters inside houses," The Nucleus, 20 (3,4): 57-60 (1983).
https://bolist.se/guide/byta-ytterpanel, Feb. 10, 2016.

* cited by examiner

METHOD AND DEVICE FOR REDUCING A FLOW OF SOIL AIR TO INDOOR AIR IN A BUILDING

TECHNICAL FIELD

The present invention relates to a method for reducing a flow of soil air to indoor air in a building. The invention also relates to a device for reducing a flow of soil air to indoor air in a building, and to a building with a reduced level of soil air in its indoor air and to an alternative method for reducing a flow of soil air to indoor air in a building.

BACKGROUND

The fact that soil air containing harmful substances, primarily radon gas, can be sucked into buildings and remain therein is well known, as are the negative effects on the health of humans who dwell in such buildings. Soil air is sucked into buildings as a result of an under-pressure in the building, or alternatively an over-pressure in the ground. Mechanic ventilation or thermal buoyancy (the so-called chimney effect) sucks radon gas into the construction, via for example leaks, micro-cracks in the concrete structure and pipe penetrations.

Radon gas is volatile and is affected by the slightest air pressure change, and as a result the gas follows the movement of the soil air into buildings. The gas may move horizontally to a certain extent, but vertical buoyancies are the most common form of gas migration, mainly via micro-cracks in the concrete or leaks in the structure of the concrete slab. There are numerous harmful substances in soil air, among which radon is the best known and has the greatest impact on human health.

Constructions built with so-called blue gas concrete (also known as blue concrete) entail that building materials containing radon may leak radon from walls and other construction details.

Approximately 500,000 different forms of housing and buildings in Sweden currently have radon levels exceeding 200 Bq/m$^3$, and radon gas currently causes approximately 400 deaths per year. Most of these are related to a combination of radon and smoking or passive smoking.

Since an under-pressure in buildings and over-pressure in the ground is most often the cause of radon levels exceeding the currently applicable threshold value of 200 Bq/m$^3$, radon levels in buildings where the radon is attributable to radon from the ground are often corrected with some form of extraction device, which sucks in the gas from under the concrete construction where it rests against the ground, and then blows it out via the external wall or via the deaeration vent above the roof.

If the radon gas originates from the building materials (blue concrete) the solution is "double air circulation=halved radon level", which in practice leads to a very high heating cost to manage the ventilation and the requirement thereof in relation to heating the building.

According to the National Board of Housing, there are many buildings with radon levels so high that they cannot be corrected at a reasonable cost, having regard to the cost per saved life. It is claimed that radon leaks into these problematic buildings from the building material (blue concrete) and that this is remedied by way of increasing the circulation with mechanic ventilation. However, this entails significant disadvantages, partly because the heating cost of the building increases drastically, as mentioned above, and partly because it is associated with high investment costs.

Prior art devices and methods to prevent penetration of radon into buildings and to remove existing radon in indoor air are described in among others U.S. Pat. No. 8,806,824 B2, GB 2 236 127, U.S. Pat. No. 4,907,386, EP 0528502 A1, DE 4226722 A1, US2007157533 A1, U.S. Pat. No. 6,543,189 B1, EP 0 583 858 A1, U.S. Pat. No. 5,107,642, GB 2478342, EP 2 177 669 A2, WO 2009044047 A2, and KR20120040927 A. However, none of these technologies can, in a satisfactory manner, prevent radon from penetrating into buildings.

Accordingly, there is a great need for improved methods to reduce the level of radon in buildings, for health as well as for economic reasons.

DESCRIPTION OF THE INVENTION

The purpose of the present invention is to eliminate or at least reduce the problems described above. This is achieved by a method and a device according to the enclosed independent claims, where movement of air in the wall of a building is impacted, preventing soil air from the ground or an area near the ground from moving up inside the wall and entering the building itself.

When soil air moves in the direction of the least pressure, there is, however, a hitherto unknown source of elevated levels of e.g. radon in buildings. Vertical buoyancies in external walls and certain internal walls of older type may give rise to very high concentrations of radon in buildings on all levels.

The purpose of an external wall is, by nature, to reduce heat loss or otherwise reduce the impact of the ambient atmosphere on the climate inside the climate zones, and accordingly a certain air movement is allowed in the external wall. With an under-pressure created in the building by the thermal buoyancy (self-ventilating buildings) or the mechanic ventilation, an air migration outside the climate zones (external wall) into the building also occurs.

When the radon gas is permitted, via the external wall construction, to migrate into the external wall, the wall becomes just as radon-carrying as a slab on the ground may be, with very high concentrations of radon gas moving into the building via different types of leaks. External walls with insulation in the external wall, where air may be sucked in via the ground, give rise to a risk of the radon gas rising to very high levels, due to the air gap intended to ensure that the façade withstands the climate outside the building's climate zone.

When an under-pressure is established in the pre-cast/plaster surface between the building's façade and the inner structure in the wall, a vertical air movement in all or parts of the wall section occurs, until it meets an obstacle which terminates the buoyancy. In this case the obstacle is the under-pressure which is present in buildings as a result of the under-pressure created by the ventilation in the building. The air which moves in this area is, if it is connected to the ground, also contaminated by radon gas. Since the radon gas is volatile, it follows the other air into the buildings. The type of façade which primarily causes this problem is fitted below ground and continues up along the façade.

Often, apartment buildings have problems with elevated radon levels on the upper levels. The radon levels may seem inexplicable and are often attributed to the building materials or movements in pipes. However, measures to counteract this have no effect since they do not affect the air movement in the façade construction. By way of investigations, however, the inventor has identified radon in the permeable air layer of façades. Furthermore, air movements have been identified where the concrete structure meets the external wall, occurring because this concrete "bridge" enters the façade where air movements exist in connection with the external wall material.

Thus, the present invention is based on the knowledge that the presence of harmful substances in soil air, primarily radon, in buildings can only partly be explained by the fact that radon leaks in through the baseplate and cracks or penetrations in the same. Contrary to what has for long been deemed to be an established scientific truth, a significant supply of radon may occur through walls, even high up in a multi-storey building, because of the thermal buoyancy of air in the external wall, and radon gas can then find its way into the building. Thanks to this knowledge, entirely new methods and devices to reduce the level of radon in existing buildings and to prevent the presence of radon in newly produced buildings may be created. By using the present invention and the knowledge on which it is based, the radon concentration in buildings may thus be reduced drastically, and in some cases entirely eliminated, which is impossible with current technologies, since they are not based on knowledge of how the problem actually arises. Contrary to prior art methods and devices in the area, the present invention is also a passive system, which does not give rise to costs in the form of increased energy consumption for heating or constant operation of fan devices to ventilate radon contaminated air.

DRAWINGS

The invention is described in detail below with reference to the enclosed drawings, wherein FIG. 1 shows a plane view of a building into which soil air leaks through floors and walls;

DETAILED DESCRIPTION

Figure 1:
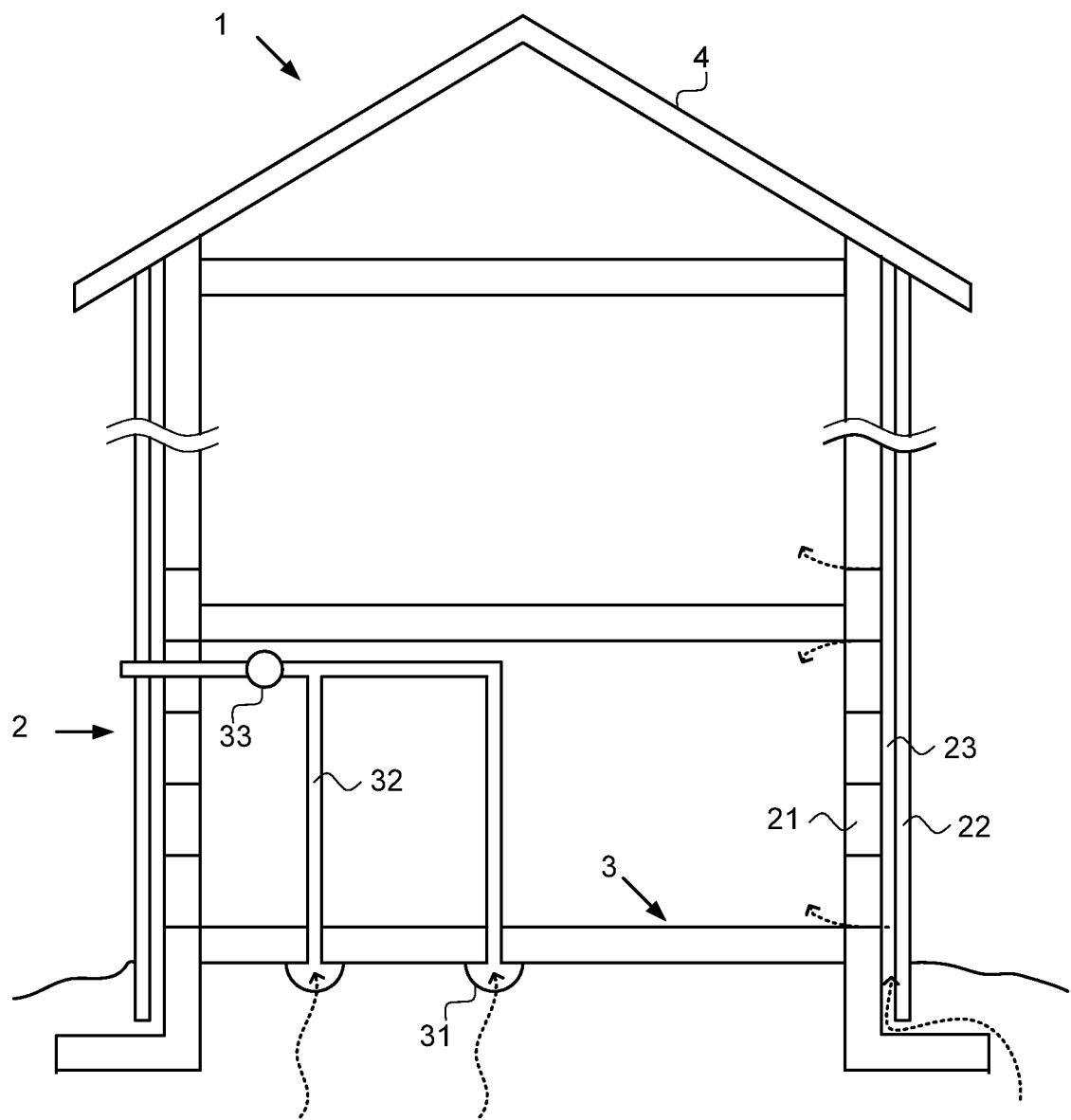

FIG. 1 shows a building 1 with walls 2, a baseplate 3 and a roof 4, into which soil air, which may contain among others radon from radon contaminated soil, leaks. As has long been known in the art, soil air oozes up toward the baseplate 3 and penetrates into the building through cracks or leaks and merges with the indoor air in the building. This is illustrated with dashed arrows toward the baseplate 3 in the figure. The conventional manner of reducing the radon level has been, as illustrated in the figure, to drill holes, so-called radon extractors 31, through the baseplate 3 and connect them to pipes 32 connected to an extractor device 33 with a fan that blows the radon gas out of the building, thus reducing the amount of gas present below the building. However, this evacuation only creates a reduction of soil gas between the outer foundation walls that function as barriers and prevents evacuation of soil gas beyond these.

Please note that the use of terms such as "up", "down", "top" or "bottom" herein relate to the directions that are normally up and down on a building, i.e. up towards a roof and down toward the ground on which the building stands. Please also note that radon is specified here as an example of harmful substances in soil air, and that the invention is also advantageously used to reduce the level of other substances (humidity).

The figure also illustrates the second and hitherto unknown manner in which radon penetrates into the building. Inside the wall 2 there is generally an inner part 21, which is load bearing in at least some part of the wall, and a façade 22, which is attached to the inner part 21 and designed to provide insulation and a water-proof surface layer to prevent water from penetrating into the wall 2. Often, the façade 22 runs along the inner part 21 all the way down to the ground, to achieve a uniform appearance. In the façade 22 there is also a permeable channel 23 in which an air volume may move, often in the form of a pre-cast or plaster surface. Radon may penetrate into a wall from the surrounding ground and merge with the air volume, rising through thermal movement and penetrating into the building via leaks or penetrations in the inner part 21 of the wall 2, so that it merges with the indoor air. A permeable channel is thus an elongated area in the wall, which may be penetrated by air, in this case soil air containing radon gas.

Figure 2:
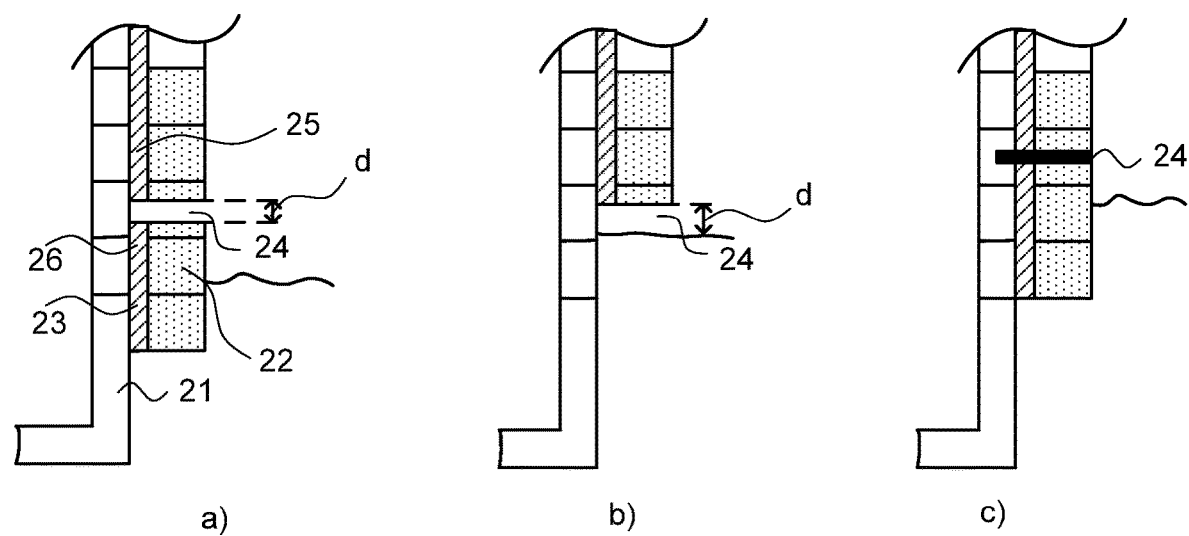
FIG. 2a shows a cross sectional view of a house wall with a recess in the façade, according to a preferred embodiment of the present invention.
FIG. 2b shows a cross sectional view of a house wall where a part of the façade connected with the ground has been removed.
FIG. 2c shows a cross sectional view of a house wall where an object has been inserted as a flow stop.

FIG. 2a-c shows the wall 2 in more detail, where the inner part 21, the façade 22 and the permeable channel 23 are visible. In FIG. 1, there is an air volume in the permeable channel 23, able to move freely therein, but FIG. 2a-c also illustrates different versions of a flow stop 24, to achieve an obstacle to the movement of the soil air up through the wall.

In FIG. 2a the flow stop 24 is in the form of a recess in the façade 22, all the way in through the permeable channel 23 to the inner part 21. Thanks to the flow stop 24 the air volume is divided into a first air volume 25 in the permeable channel 23 on one side of the flow stop 24, and a second air volume 26 in the permeable channel 23 on the other side of the flow stop 24. A flow stop 24 thus prevents a connection between the first air volume 25 and the second air volume 26, so that they are separated from each other. The second air volume 26 is located in the lower part of the façade 22 and therefore contains soil air with radon, while the first air volume 25 is located in an upper part of the façade 22, above the flow stop 24, and is accordingly radon free. Thanks to the flow stop, air sucked into the first air volume 25 is taken from the ambient outdoor air rather than from the second air volume 26.

The flow stop 24 may thus be designed in many different ways, and in its simplest form it is a distance between the first air volume 25 and the second air volume 26, sufficiently large to allow circulation of outdoor air in the recess, which distance is within the interval 2 to 15 cm.

In FIG. 2b, the flow stop 24 is in the form of a recess made where the bottom part of the façade, connected with the ground, has been removed. Accordingly, air in the permeable channel 23 is taken from the surrounding environment rather than from the ground.

In FIG. 2c the flow stop 24 is in the form of an object, for example a plate or similar, which is inserted into the façade and cuts off the permeable channel 23, preventing the flow of soil air.

Figure 3:
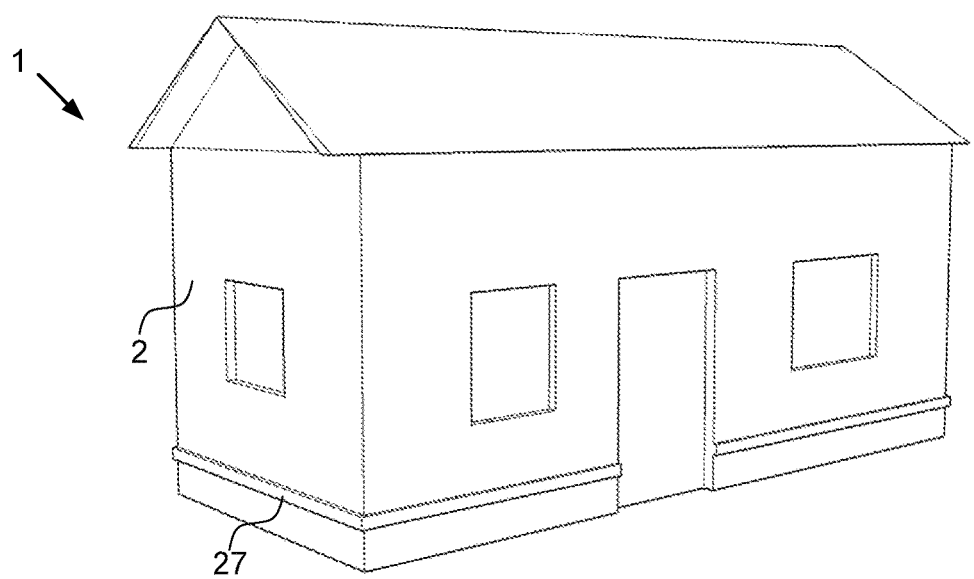
FIG. 3 shows a perspective view of a building with a device according to the invention.

When the flow stop 24 is in the form of a recess as in FIG. 2a, it is advantageous also to add a drip strip to be fitted at the inner part 21 of the wall 2 and running out from the wall 2 essentially perpendicular in relation to said inner part 21. The drip strip 27 is attached with fixings and is preferably angled downwards in an external part to prevent water from rain and snow entering into the façade 22 in the bottom part. In order to secure the thermal buoyancy in the permeable channel 23 above the flow stop 24, the drip strip 27 is fitted at a distance from the façade so that air may easily flow between the façade 22 and the drip strip 27 and penetrate into the permeable channel 23 to merge with the first air volume 25. This is illustrated in FIG. 3, with a building 1 where a recess has been made to form a flow stop 24. Furthermore, a drip strip 27 has been fitted along at least two walls 2. The flow stop 24 is essentially horizontal and without interruptions, which prevents radon contaminated air from the ground from penetrating past the flow stop 24 and continuing up into the first air volume 25 above the flow stop 24. It is thus obvious that it is advantageous for a flow stop 24 to be made along all the walls 2 of the building 1, or at least along all the walls 2 where the façade 22 runs all the way down into the ground, or at least along an entire wall 2 from a first end to a second end, but it is also possible that a reduction of the radon level may be achieved by way of a flow stop 24 along only one wall 22 or even a part of a wall 22.

If the flow stop 24 is a recess, the recess is preferably approximately 2-15 cm high, depending on the load bearing capacity of the wall and its construction at a given building, but it is obvious that other height measurements or depth measurements may be suitable at certain buildings, depending on their specific characteristics.

Since the flow stop 24 is arranged at the same level or lower than a floor on the ground floor of the house, the soil air is efficiently prevented from penetrating into the ground floor and thus also into higher floors. It is thus very advantageous for the flow stop to be placed level with or lower than the floor, even if other placements may also be considered, depending on the design and characteristics of the wall, in particular the placement of the permeable channel.

Figure 4:
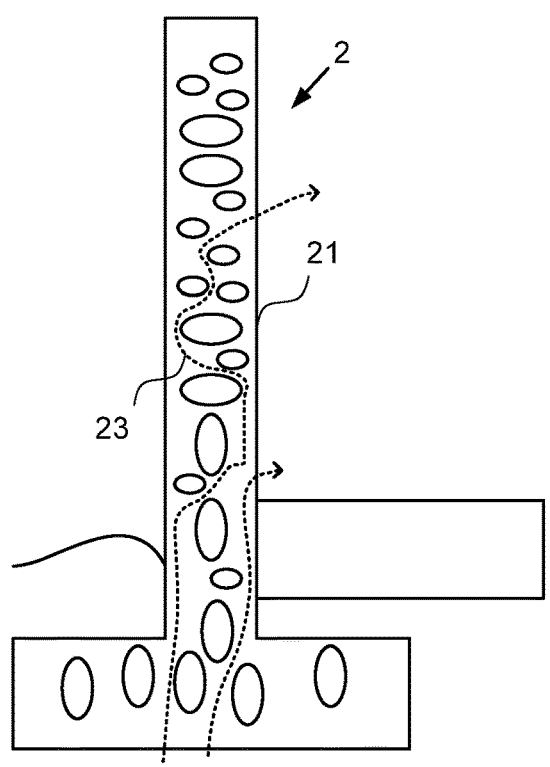
FIG. 4 shows a cross sectional side view of a wall where a permeable part is inside the wall.
Figure 5:
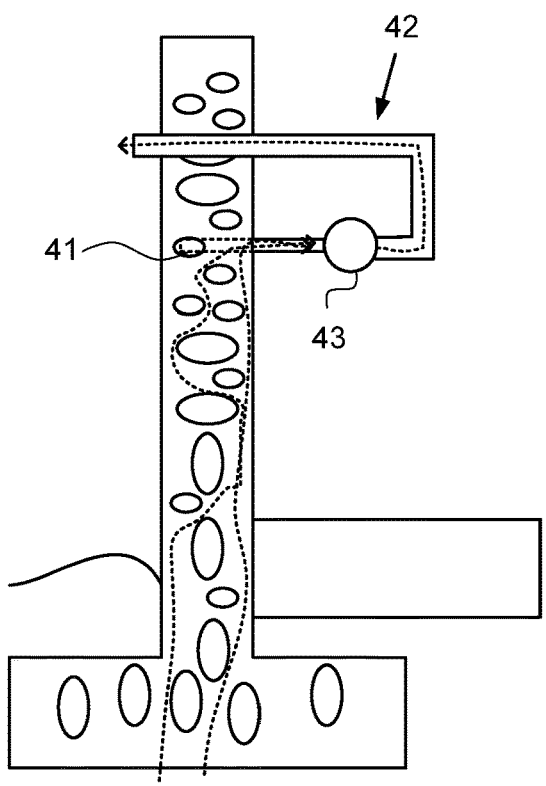
FIG. 5 shows a cross sectional side view of the wall in FIG. 4, with a preferred embodiment of an alternative method to reduce radon concentration by removing air from the wall.

FIG. 4 shows an alternative embodiment of a wall 2, where the wall's inner part 21 is heterogeneously designed and sufficiently porous for a permeable channel 23, extended to form a permeable area, to fit inside the inner part 21 itself. An example of a material with such heterogeneous and porous characteristics is concrete, but other materials may also be applicable. Radon gas may thus penetrate up into and through the inside of the wall 2 from the underlying ground, and may then ooze into the building 1 from there. In order to reduce the radon concentration in indoor air, a hole 41 may be created, for example by way of boring from the inside of the house, from the surface and into the inside of the wall 2, and an extraction device 42 may be connected to such hole, with a fan 43 arranged to extract radon-contaminated air from the wall 2, wherein an under-pressure is created in the wall 2. This is illustrated in FIG. 5.

Figure 6:
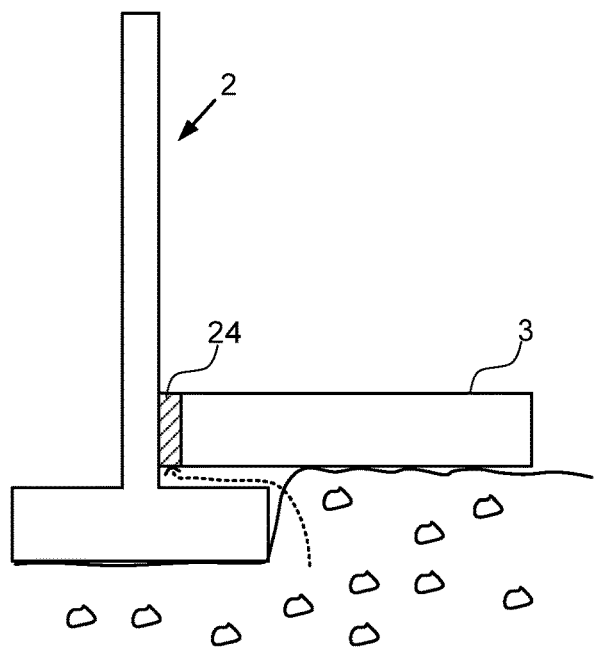
FIG. 6 shows a cross sectional view of a wall and a baseplate of a building, where a flow stop is inserted between the same.

FIG. 6 shows an embodiment where soil air leaks up through the insulation, which may for example consist of Heraklith insulation boards, i.e. through an area where the baseplate 3 of the house is attached to the wall 2. The flow stop 24 is thus achieved thanks to a seal between the baseplate 3 and the wall 2.

Please note that the above description referring to one embodiment may also be freely combined with other embodiments, as a person skilled in the art will realise.

The invention claimed is:

1. Device for reducing a flow of soil air to indoor air in a building (1), wherein the building (1) comprises at least one wall (2), and said device comprises
   a permeable channel (23) connected with soil air,
   a flow stop (24) for the soil air in the permeable channel (23) to reduce the flow of soil air,
   a façade (22) fitted on an inner part (21) of the wall (2), said façade (22) comprising said permeable channel (23), said permeable channel (23) containing an air volume,
   the flow stop (24) separating at least a part of the façade (22), to divide the air volume into a first upper air volume (25) and a second lower air volume (26), and comprising a recess in the façade (21) through the permeable channel (23), to distance a first part of the permeable channel (23) which includes the first upper air volume (25), and a second part of the permeable channel (23) which includes the second lower air volume (26), from one another, and
   said stop (24) positioned to suck ambient outdoor air through the façade (22) and into said first upper air volume (25) rather than from said second lower air volume (26).

2. Device according to claim 1, additionally comprising an object insertable into said recess (24).

3. Device according to claim 1, wherein said flow stop (24) is obtained by removing a part of the façade, which is connected with the ground.

4. Device according to claim 1, wherein the flow stop comprises a drip strip (27), which is fitted in the wall and arranged to protect the façade below the flow stop from rain and snow.

5. Device according to claim 4, wherein the drip strip is designed with a drip protection part, which is integrated with the drip strip or which is moveable in relation to the drip strip and may be attached to it.

6. Device according to claim 1, wherein the flow stop is integrated with the façade.

7. Device according to claim 1, wherein the flow stop comprises a seal between the wall and a baseplate of the building.

8. Device according to claim 1, wherein the flow stop (24) is arranged level with or lower than a floor on the ground floor of the building.

9. Building comprising at least one wall with a device according to claim 1.

* * * * *